(12) United States Patent
Büttner et al.

(10) Patent No.: US 11,043,868 B2
(45) Date of Patent: Jun. 22, 2021

(54) SQUIRREL CAGE ROTOR OF AN ASYNCHRONOUS MACHINE

(71) Applicant: Siemens Aktiengesellschaft, Munich (DE)

(72) Inventors: Klaus Büttner, Hollstadt (DE); Klaus Kirchner, Ostheim (DE); Matthias Warmuth, Windshausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 214 days.

(21) Appl. No.: 16/310,290

(22) PCT Filed: May 5, 2017

(86) PCT No.: PCT/EP2017/060768
§ 371 (c)(1),
(2) Date: Dec. 14, 2018

(87) PCT Pub. No.: WO2017/215834
PCT Pub. Date: Dec. 21, 2017

(65) Prior Publication Data
US 2019/0190338 A1 Jun. 20, 2019

(30) Foreign Application Priority Data
Jun. 16, 2016 (EP) .................... 16174676

(51) Int. Cl.
*H02K 9/20* (2006.01)
*H02K 3/24* (2006.01)
(Continued)

(52) U.S. Cl.
CPC ............ *H02K 3/24* (2013.01); *F28D 15/025* (2013.01); *F28D 15/0275* (2013.01); *H02K 9/20* (2013.01);
(Continued)

(58) Field of Classification Search
CPC .......... H02K 3/24; H02K 15/00; H02K 17/16; H02K 9/20; F28D 15/02
See application file for complete search history.

(56) References Cited

U.S. PATENT DOCUMENTS 3,891,875 A * 6/1975 Laskaris ................ H02K 55/04
310/40 R
4,311,932 A * 1/1982 Olson ...................... H02K 9/19
310/59
(Continued)

FOREIGN PATENT DOCUMENTS

DE 20 52 839 A1 4/1972
DE 10 2014 225 173 A1 6/2016
(Continued)

OTHER PUBLICATIONS

PCT International Search Report and Written Opinion of International Searching Authority dated Sep. 6, 2017 corresponding to PCT International Application No. PCT/EP2017/060768 filed May 5, 2017.
(Continued)

*Primary Examiner* — Naishadh N Desai
(74) *Attorney, Agent, or Firm* — Henry M. Feiereisen LLC

(57) ABSTRACT

A squirrel cage rotor for an asynchronous machine includes a magnetically conductive main body which is mounted for rotation about an axis and includes electric conductors in substantially axially extending slots. The electric conductors are electrically contacted by short-circuit rings which are located on end faces of the magnetic main body and configured as a thermosiphon.

13 Claims, 2 Drawing Sheets

(51) Int. Cl.
*H02K 17/16* (2006.01)
*F28D 15/02* (2006.01)
*H02K 15/00* (2006.01)

(52) U.S. Cl.
CPC ....... *H02K 15/0012* (2013.01); *H02K 17/165* (2013.01)

(56) References Cited

U.S. PATENT DOCUMENTS

| | | | |
|---|---|---|---|
| 9,257,883 | B2 | 2/2016 | Buettner et al. |
| 2007/0096588 | A1 | 5/2007 | Kirchner et al. |
| 2012/0133236 | A1 | 5/2012 | Buettner et al. |
| 2012/0169158 | A1* | 7/2012 | Buttner .................. H02K 9/20 310/54 |
| 2013/0187512 | A1 | 7/2013 | Buettner et al. |
| 2015/0069861 | A1* | 3/2015 | Buttner .................. H02K 9/14 310/43 |
| 2015/0349616 | A1* | 12/2015 | Buttner ............. H02K 15/0012 310/211 |
| 2016/0056674 | A1 | 2/2016 | Buettner et al. |
| 2016/0087501 | A1* | 3/2016 | Mader ................... H02K 3/28 310/208 |
| 2017/0012481 | A1 | 1/2017 | Buettner et al. |
| 2017/0170703 | A1 | 6/2017 | Buettner et al. |
| 2018/0083500 | A1 | 3/2018 | Buettner et al. |

FOREIGN PATENT DOCUMENTS

| | | | |
|---|---|---|---|
| EP | 2 299 565 | A1 | 3/2011 |
| EP | 2 846 440 | A1 | 3/2015 |

OTHER PUBLICATIONS

Buettner et al, U.S. Pat. No. 10,090,719, Oct. 2, 2018, 2016-0056673-A1, Feb. 25, 2016.
Buettner et al, U.S. Pat. No. 10,027,211, Jul. 17, 2018, 2015-0349616, Dec. 3, 2015.
Buettner et al, U.S. Pat. No. 9,935,519, Apr. 3, 2018, 2015-0214810-A1, Jul. 30, 2015.
Buettner et al, U.S. Pat. No. 9,876,411, Jan. 23, 2018, 2015-0207378-A1, Jul. 23, 2015.
Buettner et al, U.S. Pat. No. 9,787,164, Oct. 10, 2017, 2015-0042185-A1, Feb. 12, 2015.
Buettner et al, U.S. Pat. No. 9,768,666, 2014-0217840-A1, Aug. 7, 2014.
Buettner et al, U.S. Pat. No. 9,281,728, Mar. 8, 2016, 2013-0257197, Oct. 3, 2013.
Buettner et al, U.S. Pat. No. 9,287,754, Mar. 15, 2016, 2013-0234543, Sep. 12, 2013.
Buettner et al, U.S. Pat. No. 9,515,536, Dec. 6, 2016, 2012/0169158 A1, Jul. 5, 2012.
Buettner et al, U.S. Pat. No. 8,963,394, Feb. 24, 2015, 2012/0187796, Jul. 26, 2012.
Buettner et al, U.S. Pat. No. 8,836,193, Dec. 29, 2011, 2011/0316380 A1, Dec. 29, 2011.
Buettner et al, U.S. Pat. No. 9,252,642, Feb. 2, 2016, 2012/0205996, Aug. 16, 2012.
Buettner et al, U.S. Pat. No. 9,154,017, Oct. 6, 2015, 2013-0175892, Jul. 11, 2013.
Buettner et al, U.S. Pat. No. 9,800,103, Oct. 24, 2017, 2015-0372546, Dec. 24, 2015.

* cited by examiner

SQUIRREL CAGE ROTOR OF AN ASYNCHRONOUS MACHINE

CROSS-REFERENCES TO RELATED APPLICATIONS

This application is the U.S. National Stage of International Application No. PCT/EP2017/060768, filed May 5, 2017, which designated the United States and has been published as International Publication No. WO 2017/215834 and which claims the priority of European Patent Application, Serial No. 16174676.3, filed Jun. 16, 2016, pursuant to 35 U.S.C. 119(a)-(d).

BACKGROUND OF THE INVENTION

The invention relates to a squirrel cage rotor of an asynchronous machine, to an asynchronous machine and to a method for producing a squirrel cage rotor of an asynchronous machine Squirrel cage rotors of asynchronous motors are inherently heated up above all by resistance effect losses during operation of the electrical machine. In such cases, particularly in the short-circuit ring on the end faces of the squirrel cage rotor, very high local temperatures of up to 250° C. occur. As the temperature rises the efficiency of the dynamoelectric machine falls however. Furthermore the lifetime of the bearings is also sharply reduced by these high temperatures.

In order to dissipate the resistance effect losses, it is known, in the case of squirrel cage rotors of asynchronous motors, to provide vanes on the short-circuit ring, in order, by additional air circulation, to emit the resistance effect losses from the short-circuit rings to the air in the interior of the dynamoelectric machine. This method of cooling however is not very efficient and can only deal with the disadvantages described above to a limited extent.

SUMMARY OF THE INVENTION

Using this as its starting point, the underlying object of the invention is to create a squirrel cage rotor of an asynchronous machine, which guarantees a sufficient dissipation of heat from the squirrel cage rotor. Furthermore an asynchronous machine with a high efficiency is to be provided. It is likewise an object of the invention to provide a suitable method for producing said rotor.

The stated object is successfully achieved by a squirrel cage rotor of an asynchronous machine comprising a magnetically conductive main body, which is mounted so as to be able to rotate about an axis and includes electrical conductors in slots extending substantially axially, said electrical conductors being electrically contacted by short-circuit rings, which are provided on end faces of the magnetic body and are designed as a thermosiphon.

The stated object is likewise successfully achieved by an asynchronous machine with an inventive squirrel cage rotor as a drive for wheeled vehicles or track-based vehicles, for maritime applications and also for aircraft.

The stated object is also successfully achieved by a method for producing an inventive squirrel cage rotor, by the following steps:
  Production of a magnetically conductive main body,
  Insertion of electric conductors into slots extending substantially axially of the magnetic main body,
  Electrical contacting of short-circuit rings on the end faces of the magnetically conductive main body with electric conductors, wherein a void of the short-circuit ring is produced by a 3D printing method, by sand casting or by machine processing of a cast short-circuit ring sealed by a cover.

The short-circuit ring of the squirrel cage rotor is now designed, in accordance with the invention, as a thermosiphon, wherein in this design the short-circuit ring in particular has a void, which is filled with water or with another coolant. In accordance with the working temperature of the coolant in the void, an operating pressure, e.g. a vacuum, is generated in said void during the production of the squirrel cage rotor, in order to create the ideal operating point of the coolant for the respective application of the asynchronous machine. The void of the short-circuit rings thus functions as a thermosiphon on the end faces of the squirrel cage rotor, which has a magnetically conductive main body.

In a further design, by a thermal linkage of the short-circuit ring, preferably to a liquid-cooled shaft, an increased efficiency of the circuit of evaporation and condensation within the thermosiphon is achieved. In this design condensation now occurs inside the short-circuit ring. After the condensation of the coolant, a liquid is thus present, said liquid is conveyed radially outwards by the centrifugal force occurring during operation of the asynchronous machine. On the way radially outwards, because of the higher temperature of the surfaces forming the void, in particular in the direction of the end face of the magnetic main body, this results in an evaporation of the coolant. This vapor is pushed back again into the inner area, i.e. in the direction of the shaft to the condenser, by excess pressure against the centrifugal force.

There it is recooled, in particular by the liquid-cooled shaft. Thus the heat in the short-circuit ring is transported into the shaft and from there, via the shaft cooling, away from the inside of the motor.

Through the specific embodiment of the short-circuit ring designed as a thermosiphon, i.e. of the void provided by inclined surfaces, both the evaporation and also the condensation process are supported.

Such an embodiment of a squirrel cage rotor now increases the efficiency of an asynchronous motor. The asynchronous motor is especially suitable, inter alia, as a drive for all types of vehicles, since, for example, this lost energy does not have to be emitted into the environment, but is able to be used in a similar way to combined heat and power for other applications, in automotive engineering for example, to heat a passenger compartment.

Vehicles in this case are understood as wheeled vehicles or track-based vehicles such as E-cars, streetcars, power cars, locomotives, buses and mine vehicles, but also vehicles in maritime areas, such as small boats, pleasure boat etc. Likewise an asynchronous motor of this type is suitable as a drive for aircraft such as E-planes or helicopters.

Such drives are also suitable for other applications in the industrial environment, e.g. in machine tools or compressors.

Suitable production methods for embodying the void in the short-circuit ring are 3D printing methods and also a sand casting method or other alternative void-forming casting methods. Likewise a short-circuit ring cast in full material can be machined accordingly and sealed with a cover.

In order to obtain an operating pressure, e.g. a vacuum, in the void of the short-circuit ring, the void can be evacuated and filled with the coolant via a vacuum opening, which can subsequently be closed-off again.

BRIEF DESCRIPTION OF THE DRAWING

The invention as well as further advantageous embodiments of the invention will be explained below in greater detail with reference to an exemplary embodiment shown as a basic diagram: In the figures

DETAILED DESCRIPTION OF PREFERRED EMBODIMENTS

Figure 1:
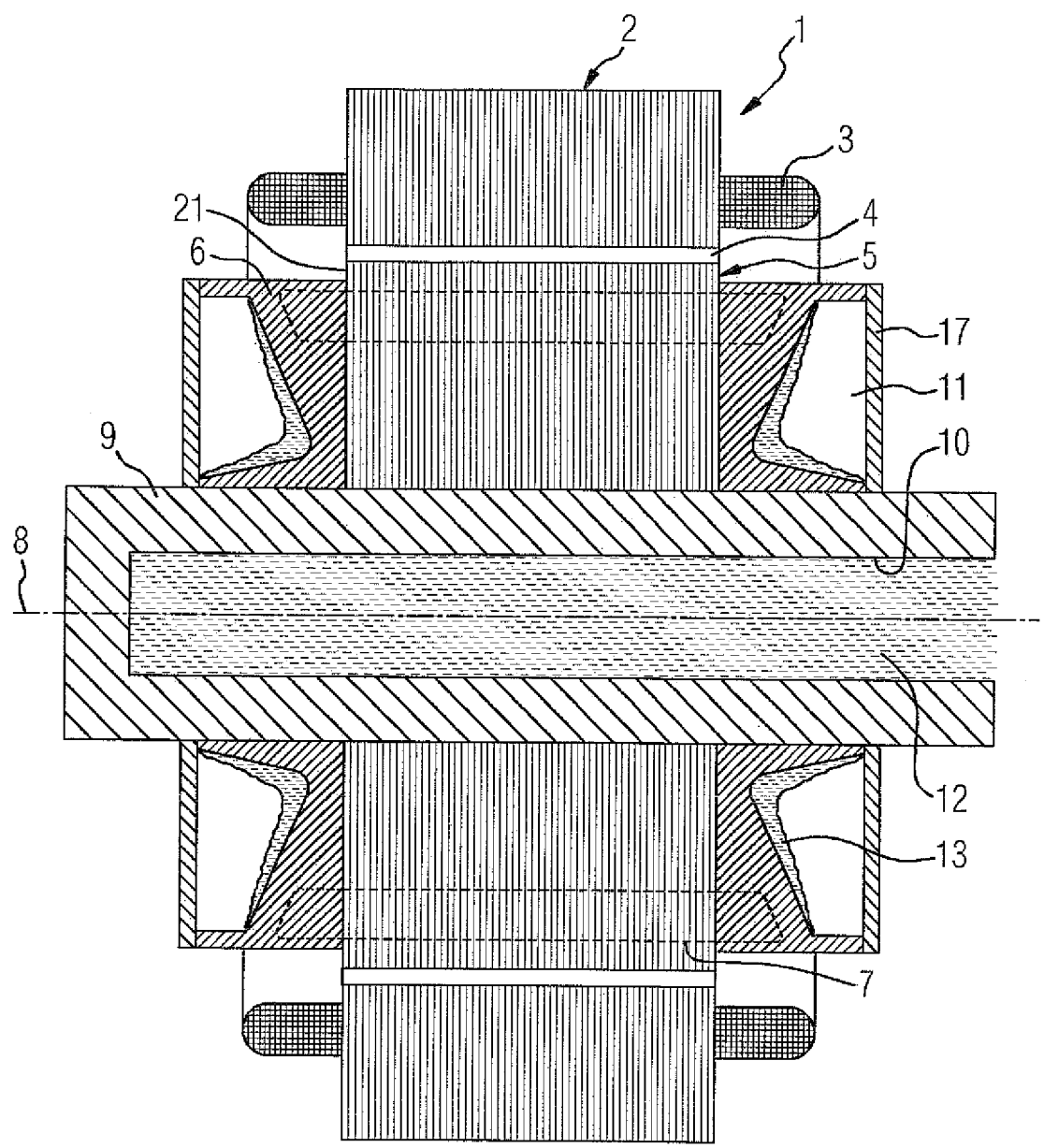
FIG. 1 shows a basic longitudinal section of an asynchronous motor.

FIG. 1 shows a basic longitudinal section of an asynchronous motor 1 with a stator 2 embodied from laminated sheets of metal, which has a winding system 3 in slots of the stator 2 not shown in any greater detail, which forms winding heads on the end faces of the stator 2. Via an air gap 4 of the asynchronous machine, by electromagnetic interaction with a squirrel cage rotor there is rotation about an axis 8. The squirrel cage rotor has a magnetically conductive main body 5, which in this case is embodied as an axially layered laminated core, but can also be provided as a one-piece sintered part.

Here electric conductors 7, which are electrically contacted with short-circuit rings 6 on the end faces of the magnetic main body 5, run in axial slots of the squirrel cage rotor not shown in any greater detail. In this form of embodiment the short-circuit rings 6 on the end faces are in thermal conductive contact both with the end face 21 of the magnetic main body 5 and also with a shaft 9.

Each short-circuit ring 6 has a void, which is embodied as a thermosiphon 11. According to the invention a condensation or a formation of vapor now takes place in this void such that the recooling again takes place in the area of the radial inner area of the thermosiphon 11, in other words in the area of the shaft 9. The shaft 9 itself is recooled in this case by lance cooling not shown in any greater detail by means of a hole 10 drilled in the shaft and a coolant 12, liquid or air, provided therein.

Thus the resistance effect losses of the squirrel cage rotor are, inter alia, now at least emitted in part via the thermosiphon 11 of the short-circuit ring 6, which is preferably in direct thermal contact with the end faces 21, to a liquid-cooled or air-cooled shaft 9 and its coolant 12. A further thermally conductive path is produced from the magnetically conductive main body 5 directly to the shaft 9.

Figure 2:
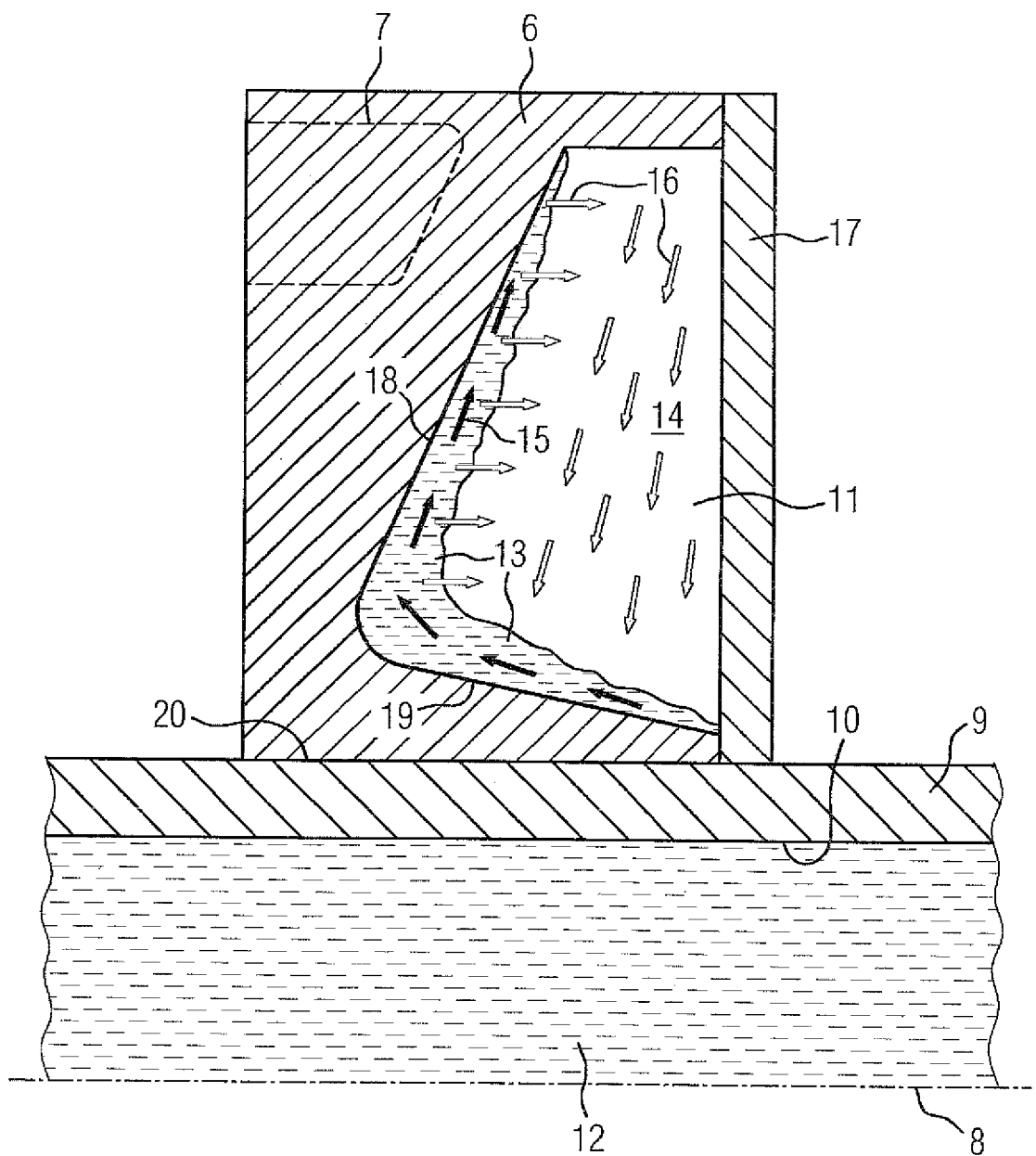
FIG. 2 shows a detailed diagram in longitudinal section of a short-circuit ring.

FIG. 2 shows a detailed view of a short-circuit ring 6 with its thermosiphon 11, wherein an electric conductor 7 is electrically contacted with the short-circuit ring 6. The losses arising in the squirrel cage rotor, in particular in the short-circuit ring 6, are now emitted via a coolant 13 on its radial way outwards via the inclined surfaces 18 to the coolant 13, which on its radial way outwards more and more adopts a vaporized state 16. As a result of the overpressure forming in the radially outer area of the thermosiphon 11, the vapor is now pushed radially inwards towards the shaft 9. In this process a condensation occurs once again at the shaft 9, preferably on the surfaces 19 and the circuit can be executed once again. The short-circuit ring 6 is at least linked thermally directly to the shaft 9 by means of a transitional heat zone 20.

A cover 17 is provided primarily when the void of the short-circuit ring 6 is produced by a metal-cutting work process.

The respective vacuum openings not shown in any greater detail are preferably located on the short-circuit rings 6 in a direction parallel to the axis.

The surfaces 18, 19 are designed to be inclined in relation to the axis 8, in order to be able to provide the required surfaces for evaporation or recooling. Additional profilings of these surfaces 18, 19, for example by microscale structures in the mm range, can improve the desired effects even further.

In order to increase the desired cooling effect, ribs extending axially and radially, starting from the cover side 17 or from the inclined surface 18, are provided in the void of the short-circuit ring 6. Their geometrical extent in the axial and radial direction, depending on the embodiment of the short-circuit ring 6, stretches from a few mm up to the entire possible radial and axial extent within the void. Accordingly a storage structure is formed within the void, of which the segments between the ribs are connected with one another in terms of flow or are self-contained in each case.

With self-contained segments in terms of flow the respective operating pressure is then naturally to be set for each segment.

Thus the surfaces for evaporation and recooling are increased. Specific surfaces for evaporation and recooling within the void of the short-circuit ring 6 can also be produced by methods of additive manufacturing for a void in the short-circuit ring 6 generated by a metal cutting method.

Basically the entire short-circuit ring, even with these types of specific surfaces for evaporation and recooling in the void, can also be produced as follows. In such cases the inventive short-circuit ring with thermosiphon 11 is pressed onto a conventional laminated core of the short circuit rotor with conductor bars and a shaft 9, in particular a hollow shaft. In this case above all the thermal transitions short-circuit ring and end faces of the laminated core and also shaft 9 to short-circuit ring 6 are embodied with low thermal transfer resistances.

The invention claimed is:

1. A squirrel cage rotor of an asynchronous machine, said squirrel cage rotor mounted for rotation about an axis and comprising:
    a magnetically conductive main body;
    a shaft having a bore for cooling the shaft;
    short-circuit rings provided on end faces of the magnetically conductive main body and thermally linked to the shaft and to the magnetically conductive main body, each said short-circuit ring having a void embodying a radially operating thermosiphon dissipating heat in the shaft, said void delimited by radially and axially inclined surfaces forming evaporation and condensation surfaces for a coolant disposed inside the void; and
    electrical conductors extending substantially axially in slots of the main body and electrically contacted by the short-circuit rings.

2. The squirrel cage rotor of claim 1, wherein at least one member selected from the group consisting of the short-circuit rings and the main body is connected to the shaft in a torsion-proof manner.

3. The squirrel cage rotor of claim 1, wherein the shaft includes a shaft cooling system.

4. The squirrel cage rotor of claim 1, wherein the short-circuit rings are configured hollow such as to realize evaporation or condensation of the coolant in the void of the short-circuit ring.

5. The squirrel cage rotor of claim 4, wherein the void of the short-circuit ring is bounded by a surface in facing relation to the end face of the magnetic main body and/or the shaft, said surface extending at a predetermined angle in relation to the axis or the end face.

6. An asynchronous machine, comprising a squirrel cage rotor as drive for a wheeled or track-based vehicle, for a maritime application, and as drive for aircraft, said squirrel cage rotor mounted for rotation about an axis and comprising a magnetically conductive main body, a shaft having a bore for cooling the shaft, short-circuit rings provided on end faces of the magnetically conductive main body and thermally linked to the shaft and to magnetically conductive main body, each said short-circuit ring having a void embodying a radially operating thermosiphon dissipating heat in the shaft, said void delimited by radially and axially inclined surfaces forming evaporation and condensation surfaces for a coolant disposed inside the void, and electrical conductors extending substantially axially in slots of the main body and electrically contacted by the short-circuit rings.

7. The asynchronous machine of claim 6, wherein at least one member selected from the group consisting of the short-circuit rings and the main body is connected to the shaft in a torsion-proof manner.

8. The asynchronous machine of claim 6, wherein the shaft includes a shaft cooling system.

9. The asynchronous machine of claim 6, wherein the short-circuit rings are configured hollow such as to realize evaporation or condensation of the coolant in the void of the short-circuit ring.

10. The asynchronous machine of claim 9, wherein the void of the short-circuit ring is bounded by a surface in facing relation to the end face of the magnetic main body and/or the shaft, said surface extending at a predetermined angle in relation to the axis or the end face.

11. A method for producing a squirrel cage rotor of an asynchronous machine, said method comprising:
  Inserting electrical conductors into substantially axially extending slots of a magnetically conductive main body;
  producing short-circuit rings with a void using a 3D printing process, sand casting, or sealing a cast one of the short-circuit rings by a cover such that the void embodies a radially operating thermosiphon dissipating heat in the shaft, said void delimited by radially and axially inclined surfaces forming evaporation and condensation surfaces for a coolant disposed inside the void; and
  placing the short-circuit ring on end faces of the magnetically conductive main body such as to electrically contact the conductors.

12. The method of claim 11, further comprising setting in the void of the short-circuit ring an operating pressure for an operating temperature of the asynchronous machine to establish an ideal operating point of coolant in the void of the short-circuit ring.

13. The method of claim 12, wherein the operating pressure is a vacuum.

* * * * *